United States Patent [19]

Scheetz

[11] 4,391,951

[45] Jul. 5, 1983

[54] NYLON 6 WITH IMPROVED WEAR LIFE

[75] Inventor: Howard A. Scheetz, Lancaster, Pa.

[73] Assignee: The Polymer Corporation, Reading, Pa.

[21] Appl. No.: 336,712

[22] Filed: Jan. 4, 1982

[51] Int. Cl.$^3$ .................... C08L 67/02; C08L 77/02
[52] U.S. Cl. .................................. 525/166; 525/92; 525/179
[58] Field of Search ............... 525/166, 925, 199, 92, 525/179

[56] References Cited

U.S. PATENT DOCUMENTS 4,001,124  1/1977  Hussey ............................. 252/12
4,014,957  3/1977  Kirsch et al. ..................... 525/425

Primary Examiner—Allan Lieberman
Attorney, Agent, or Firm—Richard O. Church

[57] ABSTRACT

Nylon 6 with increased wear life is comprised of a major weight amount of nylon 6 and minor weight amounts of a polyester elastomer, a polyolefin and a polyfluorocarbon.

4 Claims, No Drawings

NYLON 6 WITH IMPROVED WEAR LIFE

TECHNICAL FIELD

This invention relates to nylon molding and extrusion resins and, more particularly, to a type 6 nylon that is modified to increase wear life.

BACKGROUND

Nylon 6, a polymer of caprolactum, is a well-recognized engineering plastic. As is characteristic of these materials, nylon is strong, it is capable of withstanding considerable abuse, it has low coefficient of friction, long wear life and makes an excellent bearing element.

U.S. Pat. No. 4,001,124 discloses the use of minor amounts of polyolefin and polyfluorocarbon fillers to increase the wear life of a plastic bearing material. In a preferred embodiment the polyolefin is an ultra-high molecular weight polyethylene (UHMWPE), the polyfluorocarbon is polytetrafluoroethylene (PTFE) and the plastic matrix is nylon.

The present invention improves on the formulation of U.S. Pat. No. 4,001,124 in that it provides a further increase in the wear life of nylon 6.

Measurement of Wear Life

For the purposes of this specification, examples and claims, the wear life of a bearing is measured as the K wear factor.

The test procedure used to determine the K wear factor is a common one in the plastic bearing art. A ½ inch diameter journal bearing is machined from a sample and a steel shaft is inserted into the bearing for rotation. The shaft is rotated under loads measured in pounds per square inch, at velocities measured in feet per minute and the wear depth of the journal bearing is measured in inches after 200 hours. K is then calculated by substituting the recorded values in the following equation:

$$K = h/PVT$$

in which h is the wear in inches, P is the pressure in psi, V is the velocity in ft./min., and T is the time in hours. This results in a K number having units of in.-$^3$min./ft.lb.hr. and, for convenience, is expressed in values of $10^{-10}$. A low K indicates long wear and a high K indicates poor wear resistance.

OBJECTS OF THE INVENTION

It is the principal object of this invention to increase the wear life of parts made from nylon 6 molding resins.

This and other objects of this invention are achieved by melt compounding a molding resin comprised of a major weight amount of nylon 6 with minor weight amounts of a polyolefin, a polyfluorocarbon and a polyester elastomer. In a preferred embodiment of this invention, the polyolefin is UHMWPE in an amount from 2 to 5 weight percent, the polyfluorocarbon is PTFE in an amount from 2 to 5 weight percent, and the polyester elastomer is present in an amount of from 5 to 46 weight percent.

The polyester elastomers useful in the practice of this invention are unique in that they perform like conventional cross-linked elastomers over a wide temperature range but soften reversibly and flow at elevated temperatures. Consequently, they may be processed as thermoplastics, as by extrusion and other common forming techniques.

Polyester elastomers are block copolymers in which one component is an amorphous chain segment having a relatively low glass transition temperature. These portions of the molecule are referred to as "soft" segments and impart elasticity to the polymer. In addition, to prevent long range flow, the molecule must form a thermally reversible network structure in which some inter-molecular associations can unite the chains without the covalent cross-links that are common to thermosetting resins or cured rubbers. The portions of the molecule that undergo this type of association are referred to as the "hard" segments. In an article entitled "Mechanical Performance of Polyester Elastomers" presented to the Dutch Association of Plastic Processors in October, 1972, and reported in *Overdrukuitplastica*, pages 438 through 448 in October of 1973, the polyester elastomers marketed by duPont under the trademark Hytrel are described as being made from a terephthalate, a polyglycol and short chained diols. When these ingredients are reacted to form a high molecular weight polyester copolymer, diol/terephthalate blocks from the crystalline hard segments and the ether glycol/terephthalate units form the soft amorphous phase containing units of ether glycol terephthalate. Polyester elastomers are also marketed by Akzo under the trademark Arnitel.

It was further disclosed in *Overdrukuitplastica* that Hytrel polyester elastomers are made from three ingredients:

(1) a terephthalate;
(2) a polyglycol such as polytetramethylene ether glycol, polyethylene ether glycol, or polypropylene ether glycol; and
(3) short chain diols like butanediol and ethylene glycol.

When these are reacted to form high molecular weight polymers, the relative proportions of the hard segments to the soft segments will determine the hardness or stiffness of the family member.

EXAMPLE

The following ingredients were mixed together:

| Material | Weight Percent |
| --- | --- |
| Nylon 6 | 78 |
| Polyester elastomer | 15 |
| UHMWPE | 4 |
| PTFE | 3 |

This mixture was fed through a mixing extruder, melted and extruded at 220° C. in the form of ⅛" strands. The strands had an extremely smooth surface and were chopped into ⅛" lengths to form a molding resin. This molding resin, in turn, was then extruded into a 1" rod.

A ½" diameter journal bearing was machined from the rod to determine the K factor. The result, as well as the K factor for other common engineering plastics, is shown below.

| Material | K Factor ($10^{-10}$) |
| --- | --- |
| From example above | 16 |
| Nylon 6/6, UHMWPE, PTFE (U.S. Pat. No. 4,001,124) | 29 |
| Nylon 6, UHMWPE, PTFE | 60 |

| Material | K Factor ($10^{-10}$) |
|---|---|
| (U.S. Pat. No. 4,001,124) | |
| Nylon 6/6 | 72 |
| Nylon 6 | 74 |
| Nylon 6/6 + 4% UHMWPE | 81 |
| UHMWPE | 180 |
| Acetal (Homopolymer) | 190 |
| Acetal (Copolymer) | 220 |
| PTFE | 32,000 |

From the foregoing, it can be seen that the composition of this invention has the lowest K factor (longest wear life) of any material tested and is 45% better than the next best material tested. It is surprising and contrary to normal expectations for the addition of 15% polyester elastomer to reduce the K factor of an UHMWPE and PTFE filled nylon 6 from 60 to 16.

I claim:

1. A molding composition comprising a melt blend of:
    a major weight amount of nylon 6, a polymer of caprolactam, and
    2 to 5 weight percent amount of a polyolefin, 2 to 5 weight percent of a polyfluorocarbon and 5 to 46 weight percent of a polyester elastomer.

2. A molding composition according to claim 1 wherein the polyolefin is ultra high molecular weight polyethylene.

3. A molding composition according to claim 1 wherein the polyfluorocarbon is polytetrafluoroethylene.

4. A method for improving the wear life of nylon 6 which comprises blending the following:
    at least 50 weight percent nylon 6
    5 to 46 weight percent polyester elastomer
    2 to 5 weight percent polyolefin, and
    2 to 5 weight percent fluorinated polyethylene at temperatures above the melting points of both the nylon and the polyester elastomer for a time sufficient to increase the molecular weight of the blend.

* * * * *